(12) United States Patent
Nagayama

(10) Patent No.: US 7,232,150 B2
(45) Date of Patent: Jun. 19, 2007

(54) VEHICLE SEAT HAVING LIGHT ALLOY FRAME PROVIDED WITH AIRBAG MODULE

(75) Inventor: Masaki Nagayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 11/169,351

(22) Filed: Jun. 29, 2005

(65) Prior Publication Data
US 2006/0152060 A1    Jul. 13, 2006

(30) Foreign Application Priority Data
Jun. 30, 2004    (JP)    ............... 2004-194760

(51) Int. Cl.
*B60R 21/20* (2006.01)
(52) U.S. Cl. ............... 280/730.2; 297/216.13; 280/728.3
(58) Field of Classification Search ............ 297/216.1, 297/216.13; 280/728.3, 730.2, 728.1, 728.2, 280/730.1
See application file for complete search history.

(56) References Cited

U.S. PATENT DOCUMENTS

| | | | | |
|---|---|---|---|---|
| 5,651,582 A | * | 7/1997 | Nakano | ............... 297/216.13 |
| 5,785,350 A | * | 7/1998 | Inoue et al. | ............. 280/743.2 |
| 5,803,490 A | * | 9/1998 | Seventko et al. | ........ 280/730.2 |
| 5,863,063 A | * | 1/1999 | Harrell | ............... 280/730.2 |
| 5,893,579 A | * | 4/1999 | Kimura et al. | ............ 280/730.2 |
| 5,944,341 A | * | 8/1999 | Kimura et al. | ........... 280/728.3 |
| 6,095,602 A | * | 8/2000 | Umezawa et al. | ....... 297/216.1 |
| 6,439,597 B1 | * | 8/2002 | Harada et al. | ............ 280/728.2 |
| 6,974,151 B2 | * | 12/2005 | Ochiai et al. | ............. 280/728.2 |

* cited by examiner

*Primary Examiner*—Peter R. Brown
(74) *Attorney, Agent, or Firm*—Dann, Dorfman, Herrell and Skillman, P.C.

(57) ABSTRACT

A vehicle seat is disclosed. The vehicle seat includes a seat back frame made of a light alloy and formed into a substantially quadrilateral shape, the seat back frame comprising an upper section, left and right side sections, and a lower section, an airbag module provided at one of the left and right side sections, the airbag module being adapted to be enclosed by stay cloths which are sewn at one terminals thereof together with terminals of front and side portions of a trim cover, first and second retainer members secured to the side section for retaining the other terminals of the stay cloths, the first and second retainer members including applying plate portions, the applying portion of the first retainer member being applied onto one surface of the side section, the applying portion of the second retainer member being applied onto the other surface of the side section, bolts penetrating the applying portion of the first retainer member, the side section, and the applying portion of the second retainer member, and nuts mounted on the bolts, so that the first and second retainer members are fastened together to the side section so as to be interpose the side section therebetween.

3 Claims, 4 Drawing Sheets

VEHICLE SEAT HAVING LIGHT ALLOY FRAME PROVIDED WITH AIRBAG MODULE

TECHNICAL FIELD

The present invention relates to a vehicle seat which includes a seat back frame made of a recyclable light alloy such as a magnesium alloy, an aluminum alloy or the like, and an airbag module provided at a side of the seat back frame.

BACKGROUND OF THE INVENTION

Hitherto, there is known a vehicle seat which includes a seat back, and in which a seat back frame for the seat back is provided with an airbag module at a side thereof, a pair of stay cloths are provided at inner sides of front and side cover portions of a trim cover for the seat back, one terminals of the stay cloths are sewn together with terminals of the front and side cover portion of the trim cover so as to form a breakage portion of the trim cover for allowing expansion of an air bag, and the other terminals of the stay cloths are fixed to the seat back frame, whereby the air bag module is enclosed by the stay cloths (Japanese Patent Application Laid-Open No. Hei. 11-78762).

In the conventional seat back, the seat back frame is formed into a substantially quadrilateral shape by bending a metal pipe, and the other terminals of the stay cloths are fixed to a retainer or a zigzag spring provided at the seat back frame whereby the airbag module is enclosed by the stay cloths.

Also, there is known a seat back frame which is formed into a substantially quadrilateral shape, made of a light alloy such as a magnesium alloy, an aluminum alloy or the like, and comprises an upper section, left and right sections, and a lower section (Japanese Patent Application Laid-Open No. 2001-114004). When an airbag module is mounted to this seat back frame, it is conceivable that a retainer member for retaining terminals of stay cloths is provided at the seat back frame.

The retainer member can be secured to the seat back frame made of a light alloy, using bolts and nuts. However, in a case where the retainer member is fixed to the light alloy seat back frame by causing the bolts to be penetrated the seat back frame and holding the bolts in their places with the nuts, heads of the bolts or the nuts are bitten into regions of the light alloy seat back frame. As a result, the regions of the seat back frame are decreased in thickness, so that rigidity of the seat back frame is reduced.

DISCLOSURE OF THE INVENTION

It is therefore an object of the present invention to provide a vehicle seat including a seat back, in which a seat back frame for the seat back is formed of a light alloy and provided with an airbag module, and in which rigidity of the seat back frame can be positively maintained when retainer members for retaining one terminals of stay cloths serving as means to enclose the airbag module are secured to the light alloy seat back frame using bolts and nuts.

In accordance with the present invention, there is provided a vehicle seat. The vehicle seat comprises a seat back frame made of a light alloy and formed into a substantially quadrilateral shape, the seat back frame comprising an upper section, left and right side sections, and a lower section, an airbag module provided at one of the left and right side sections, the airbag module being adapted to be enclosed by stay cloths which are sewn at one terminals thereof together with terminals of front and side portions of a trim cover, first and second retainer members secured to the side section for retaining the other terminals of the stay cloths, the first and second retainer members including applying plate portions, the applying portion of the first retainer member being applied onto one surface of the side section, the applying portion of the second retainer member being applied onto the other surface of the side section, bolts penetrating the applying portion of the first retainer member, the side section, and the applying portion of the second retainer member, and nuts mounted on the bolts, so that the first and second retainer members are fastened together to the side section so as to be interpose the side section therebetween.

In the vehicle seat including the light alloy seat back frame with the airbag module, according to the present invention, the applying portions of the first and second retainer members are applied onto the surfaces of the side section of the seat back frame so as to interpose the side section therebetween, and fastened together to the side section of the seat back frame by the bolts and the nuts. Therefore, even if the seat back frame is made of a light alloy, biting of heads of the bolts and the nuts into the side section of the seat back frame can be effectively prevented by the applying portions of the first and second retainer members, so that rigidity of the seat back frame can be positively maintained.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference characters designate like or corresponding parts throughout the Figures and wherein.

DETAILED DESCRIPTION OF THE PREFERRED EMBODIMENT

Figure 1:
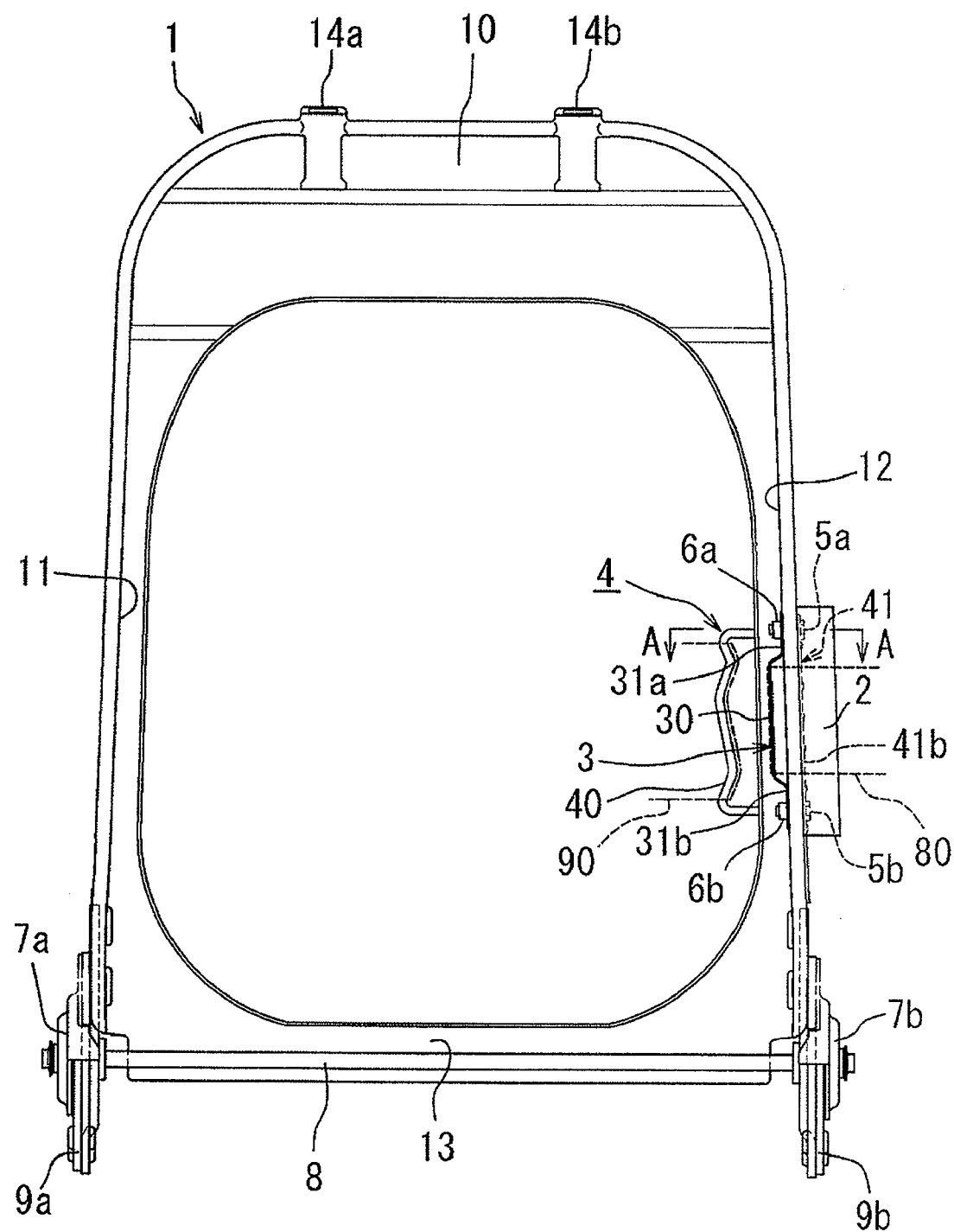
FIG. 1 is a schematic front view illustrating a light alloy seat back frame for a seat back of an assistant seat according to the present invention in which the light alloy seat back frame is provided with an airbag module.

Referring now to FIGS. 1 to 4, there is illustrated a seat back frame 1 that is one of elements making up a seat back of an assistant seat according to an embodiment of the present invention. As shown in FIG. 1, the seat back frame 1 comprises an upper section 10, right and left side sections 11, 12, and a lower section 13. The entire seat back frame 1 comprising the upper, right and left side, and lower sections 10, 11, 12, 13 is made of a light alloy such as a magnesium alloy, an aluminum alloy or the like. Preferably, the entire seat back frame is made of a magnesium alloy that is light weight and recyclable, and is formed into a substantially quadrilateral shape by die casting or injection molding.

Figure 4:
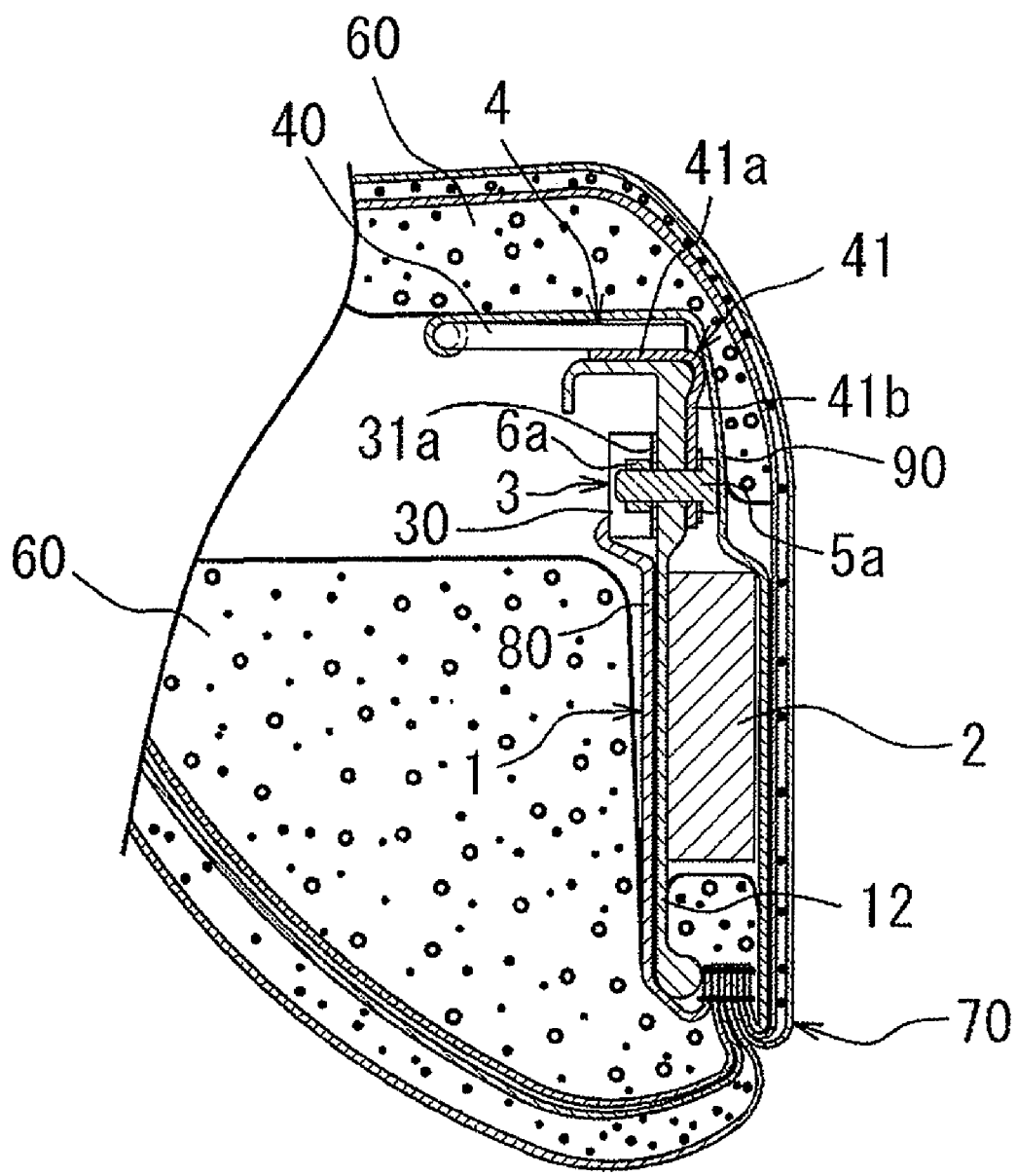
FIG. 4 is a schematic sectional view of the seat back frame, taken on a plane indicated in FIG. 1 by a line A-A, in which first and second stay cloths are connected to first and second retainer members and a trim cover.

The seat back frame 1 has an airbag module 2 provided on an outer surface of the left side section 12 thereof which is positioned on the left side of an occupant when the occupant sits on the vehicle seat. As shown in FIG. 4, a cushion 60 supported on the seat back frame is covered with a trim cover 70 to which one terminals of first and second stay cloths 80, 90 serving as means to enclose the airbag module are sewn. First and second retainer members 3, 4 for retaining the other terminals of the first and second stay cloths 80, 90 are secured to an inner portion of the left side section 12 and the outer portion of the left side section 12, respectively, with bolts 5a, 5b and nuts 6a, 6b.

Of the first and second retainer members 3, 4, the first retainer member 3 mounted to the inner portion of the left side section 12 is formed by bending a flat belt-shaped metal plate into a predetermined shape. More particularly, the first retainer member 3 comprises a main body 30 of a substantially C-shape to which the other terminal of the first stay cloth 80 is fixed, and applying plate portions 31a, 31b which project laterally from both edges of the substantially C-shaped main body 30 and are applied onto the inner portion of the left side section 12.

Figure 2:
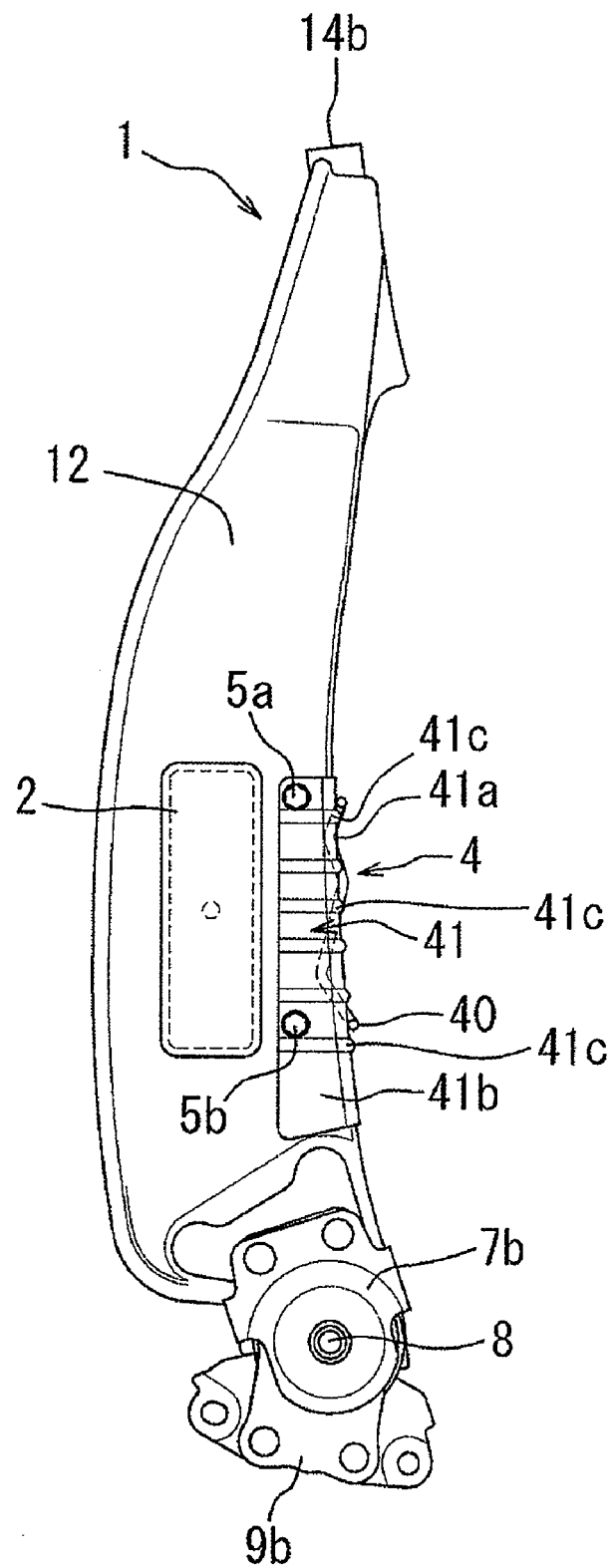
FIG. 2 is a schematic side view illustrating the seat back frame of FIG. 1.

The second retainer member 4 mounted to the outer portion of the left side section 12 comprises a main body 40 to which the other terminal of the second stay cloth 90 is fixed, and an applying plate portion 41. The main body 40 is formed into a substantially C-shape in outline by bending a metal wire. The applying plate portion 41 is formed into a substantially L-shape in cross-section by bending a flat metal plate. As shown in FIG. 2, the second retainer member 4 is secured to the left side section 12 with the substantially L-shaped applying plate portion 41 being applied onto an outer surface of a corner portion of the left side section 12.

Figure 3:
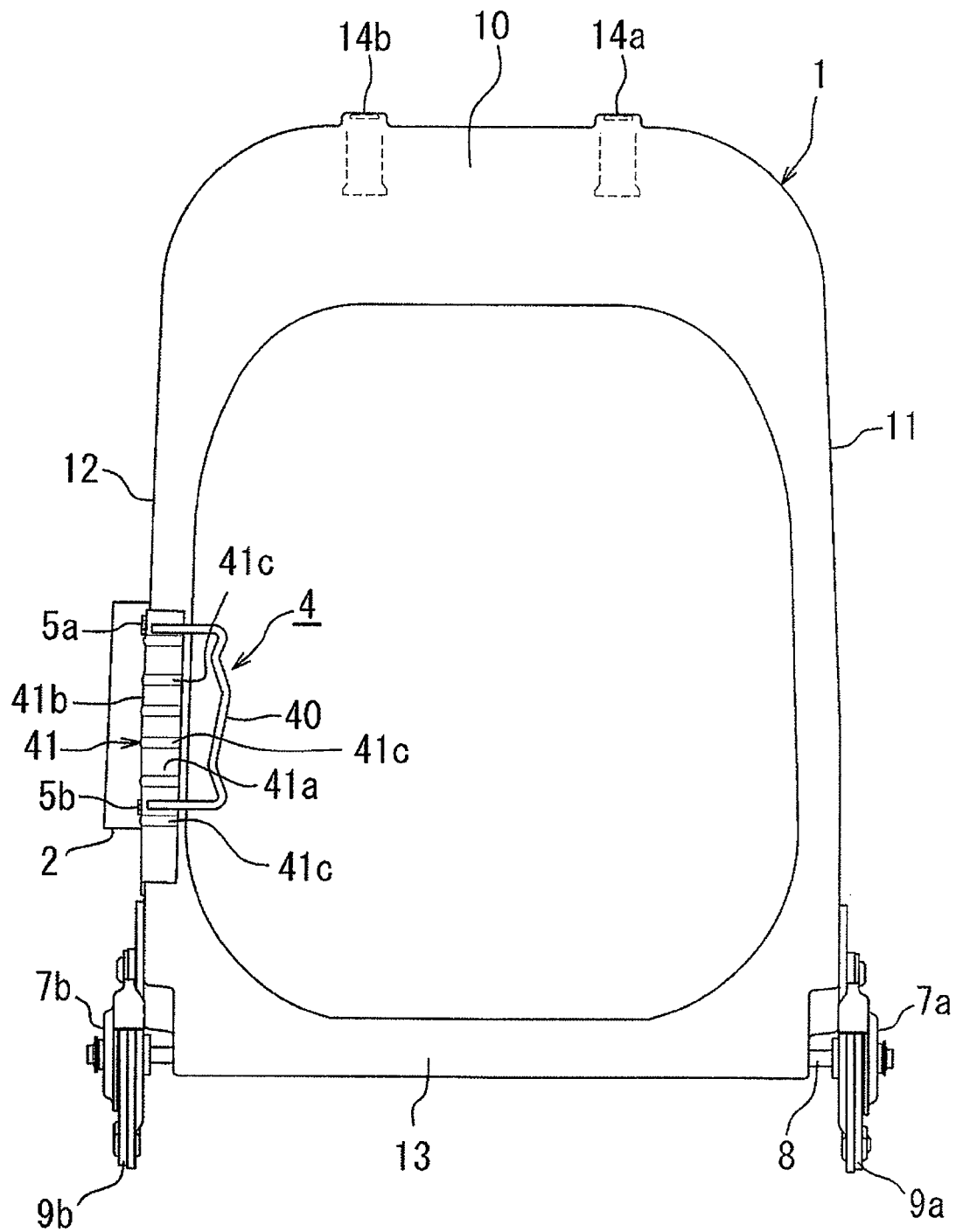
FIG. 3 is a schematic rear side view illustrating the seat back frame of FIG. 1.

As shown in FIG. 3, the applying plate portion 41 includes a back plate region 41a which is applied onto a rear portion of the side section 12, and a side plate region 41b which is applied onto a side portion of the side section 12. The main body 40 of the second retainer member 4 is attached to the back plate region 41a of the applying plate portion 41 by welding and projects inside the seat back frame 1. The main body 40 of the second retainer member 4 is bent such that an axis of the main body 40 has a corrugated shape. The applying plate portion 41 has a plurality of parallel elongated-projections 41c formed by causing regions of the applying plate portion 41 to be embossed, whereby the applying plate portion 41 is reinforced so as to be able to resist a pulling force which is produced by the second stay cloth 90 fixed to the main body 40.

As shown in FIG. 4, the second retainer member 4 is secured together with the first retainer member 3 to the left side section 12 with the side plate region 41b thereof being fastened together with the applying plate portions 31a, 31b of the first retainer 3 to the left side section 12 by the nuts 6a, 6b and the bolts 5a, 5b penetrating the side plate region 41b, the left side section 12 and the applying plate portions 31a, 31b.

In the mounting structure of the retainer members 3, 4, the applying plate portions 31a, 31b of the first retainer member 3 and the side plate region 41b of the second retainer member 4 are secured together to the left side section 12 by the bolts 5a, 5b and the nuts 6a, 6b so as to interpose the left side section 12 therebetween. Therefore, even if the seat back frame 1 is made of a light alloy, biting of heads of the bolts 5a, 5b and the nuts 6a, 6b into the left side section 12 is effectively prevented by the applying plate portions 31a, 31b of the first retainer member 3 and the side plate region 41b of the second retainer member 4, so that rigidity of the seat back frame 1 can be positively maintained.

Incidentally, in FIGS. 1 to 3, reference numerals 14a, 14b denote cylindrical holders provided at the upper section 10 for receiving and supporting stays of a head rest, reference numerals 7a, 7b designate reclining cam devices for the seat back, a reference numeral 8 denotes a connecting shaft interconnecting the reclining cam devices, and reference numerals 9a, 9b designate brackets which are to be applied to side sections of a seat cushion frame (not shown) and are to be fixed to the side sections of the seat cushion frame.

While the case where the present invention is applied to the seat back frame for the seat back of the assistant seat is discussed above, the present invention may be applied to a seat back frame for a seat back of a driver seat. In this case, the airbag module is provided at a right side section of the seat back frame.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A vehicle seat comprising:

a seat back frame made of a light alloy and formed into a substantially quadrilateral shape;

said seat back frame comprising an upper section, left and right side sections, and a lower section;

a cushion supported on said seat back frame;

an airbag module provided at one of said left and right side sections;

a trim cover for covering said cushion;

first and second stay cloths for enclosing said airbag module;

said first and second stay cloths being sewn at one terminals thereof to said trim cover;

first and second retainer members secured to said one of said side sections of said seat back frame for retaining the other terminals of said first and second stay cloths;

said first retainer member comprising a first main body having a substantially C-shape and first applying plate portions projecting laterally from both edges of said first main body;

said first applying plate portions of said first retainer member being applied onto one surface of said one of said side sections of said seat back frame;

said second retainer member comprising a second main body and a second applying plate portion;

said second main body being formed into a substantially C-shape by bending a metal wire such that said second main body has a corrugated shape and said second main body being attached to said second applying plate portion;

said second applying plate portion being applied onto the other surface of said one of said side sections of said seat back frame;

bolts penetrating said first applying plate portions of said first retainer member, said side section of said seat back frame, and said second applying plate portion of said second retainer member; and nuts mounted on said bolts, so that said first and second retainer members are fastened together to said side section of said seat back frame so as to interpose said side section of said seat back frame therebetween;

said first stay cloth being fixed at the other terminal thereof to said first main body of said first retainer member, and said second stay cloth being fixed at the other terminal thereof to said second main body of said second retainer member, to thereby enclose said airbag module.

2. A vehicle seat according to claim 1, wherein said second applying plate portion has a plurality of parallel elongated-projections.

3. A vehicle seat according to claim 2, wherein said elongated-projections are formed by causing regions of said second applying plate portion to be embossed.

\* \* \* \* \*